Patented Feb. 10, 1931

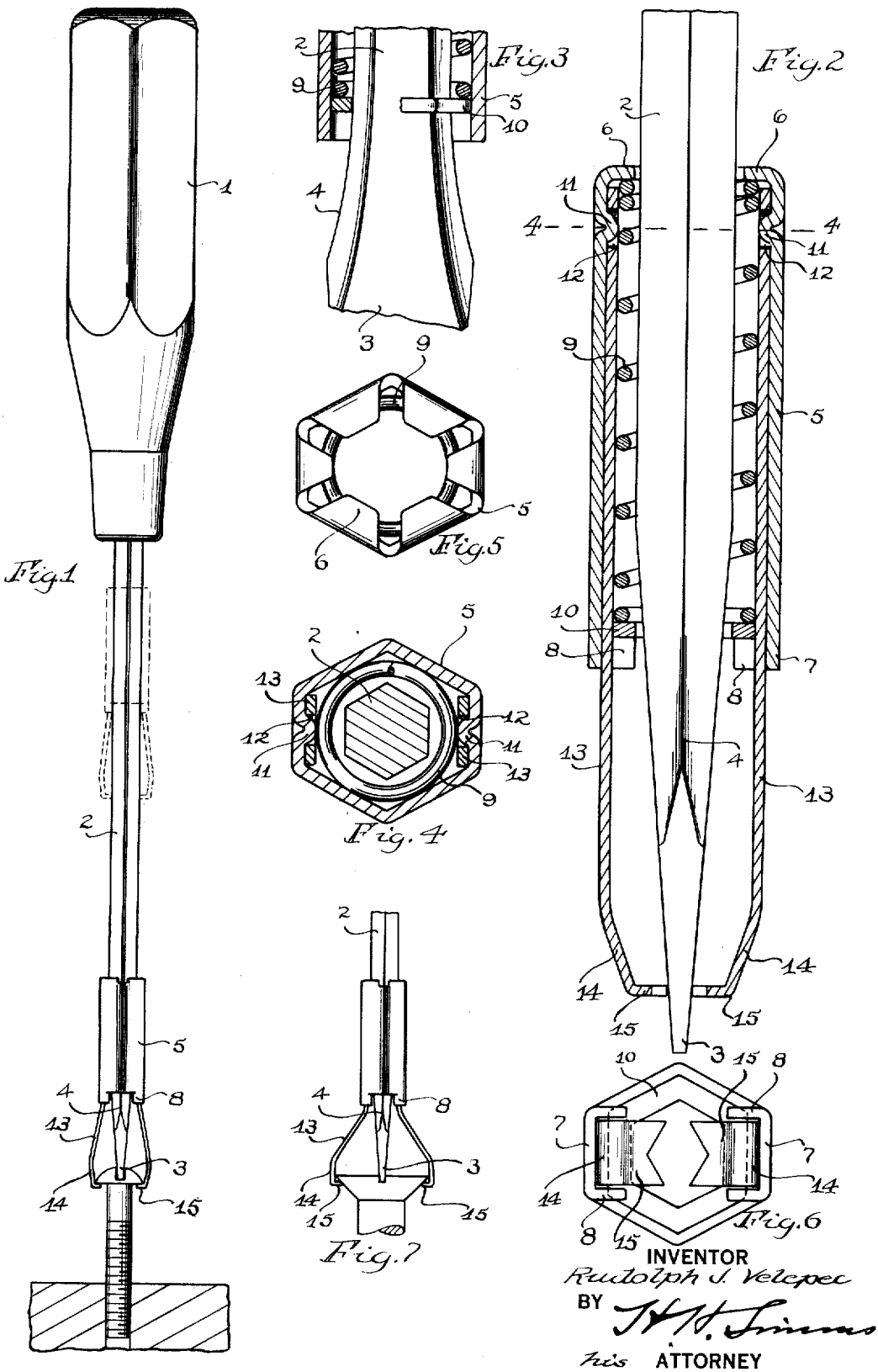

1,791,771

UNITED STATES PATENT OFFICE

RUDOLPH J. VELEPEC, OF ROCHESTER, NEW YORK, ASSIGNOR TO UPSON BROS. INC., OF ROCHESTER, NEW YORK, A CORPORATION OF NEW YORK

SCREW DRIVER

Application filed April 14, 1930. Serial No. 443,999.

The present invention relates to screw drivers, and more particularly to the type provided with screw holding means, an example of which is disclosed in my Patent No. 1,641,307, granted September 6, 1927.

An object of this invention is to improve the construction of the screw holding means shown in my before mentioned patent whereby the arms will not readily become distorted in use. Another object of the invention is to form the screw holding arms separately from the spring housing so that they may be formed of highly tempered steel to function more effectively. Still another object of the invention is to utilize the spring for holding the spring arms in interlocking relation with the casing and also for preventing their relative inward movement within the casing. A still further object of the invention is to provide such an engagement between the ends of the screw engaging arms and the shank of the screw driver that the screw holding means will be held in any position to which it may be shifted on the shank of the screw driver.

To these and other ends, the invention consists of certain parts and combinations of parts, all of which will be hereinafter described; the novel features being pointed out in the appended claims.

In the drawings:

Fig. 1 is a side view of one embodiment of my invention;

Fig. 2 is a fragmentary view of the screw driver with the spring casing in section;

Fig. 3 is a detail sectional view at right angles to that shown in Fig. 2 with the spring compressed slightly;

Fig. 4 is a section on the line 4—4, Fig. 2;

Fig. 5 is a top end view of the screw holding means removed;

Fig. 6 is a view of the other end of the screw holding means, and

Fig. 7 is a detail view showing the holding means holding a larger screw than that shown in Fig. 1.

In my prior patent, the screw holding jaws were formed in one piece with the spring casing so that, the screw holding arms could not be highly tempered without at the same time tempering the spring housing, thus rendering the assembly of the other parts therein difficult. If the spring arms are not highly tempered there they readily bend and soon become distorted, making the device not so desirably effective. Still further, the screw engaging shoulders on the holding arms were spaced apart such a distance that they would not engage simultaneously opposite the sides of the shanks of the screw driver with spring pressure.

According to this invention the spring housing and the screw holding arms are separate parts so that the holding arms may be highly tempered without affecting the spring housing in order that the latter may have the other parts of the device connected thereto without difficulty. Further, the ends of the screw engaging shoulders are spaced apart at such a distance that these ends engage with resilient pressure the opposite sides of the shank of the screw driver and hold the spring housing in any position on the shank to which the housing may be adjusted.

In the illustrated embodiment of the invention, 1 indicates the handle and 2 the shank of a screw driver, the shank having at its free end a flattened screw engaging blade 3, the upper end of which forms a stop 4. Arranged to move longitudinally of the shank is a screw holding means comprising, in this instance, a spring housing 5 formed from a single blank of sheet metal bent into tubular form and having at one end a plurality of spaced inwardly turned ears 6. The other end of the housing has two projections 7 on opposite sides formed with inwardly turned end portions 8.

Within the spring housing is a helical spring 9 which rests against the ears 6 as an abutment at one end and against a movable abutment 10 at the other end, said abutment being confined in the housing by the inwardly turned end portions 8 on the projections 7. The spring and the washer are spaced from the casing at two opposite points longitudinally thereof in line with the projections 7, and in these spaces are arranged two holding arms 13. Each of these holding arms has a portion extending longitudinally of the housing on the outside of the spring, its inner end being held in interlocking relation with the housing by the spring. This latter result is secured in this instance by a boss 11 pressed inwardly from the side wall of the housing and extending into an opening 12 in the holding arm. As each spring arm passes from the housing it extends between two of the inwardly turned lugs or ears 8 on one of the projections 7 and between said projection and the movable abutment 10. Those portions of the spring arms 13 projecting from the housing have adjacent their free ends converging portions 14 which carry inwardly turned head engaging portions 15. The ends of these portions 15 are, when not under tension as shown in Fig. 2, spaced apart a distance less than the thickness of the shank of the screw driver so that when the ends move upwardly on the shank to the position shown in dotted lines in Fig. 1, the arm will be placed under tension and hold the ends of the portions 15 with pressure against opposite sides of the shank, so that the screw holding means will lie in any position on the shank to which said means may be adjusted and thus not slide accidentally downwardly on the shank to the blade 3 and thus be in the way when not required.

It is preferred to make the shank non-circular and to construct the screw holding means in order that it will engage about the shank so as not to turn thereon although being capable of longitudinal movement on the shank. This is done in order that the screw holding arms will maintain their proper relationship to the screw blade 3. In the present instance, the shank is polygonal in cross section, the abutment 10 has a polygonal opening through which the shank is passed, and the ears 6 are arranged in a continuous series to provide a poygonal opening through which the shank passes to be guided by the ears.

In the operation of the invention, the screw holding means is moved downwardly on the shank until the abutment 10 engages the shoulder 4. At this time the parts will occupy the positions shown in Fig. 2. The screw holding means is now pressed toward the blade 3 to compress the spring 9 and force the spring engaging shoulders or projections 15 beyond the end of the blade so that a screw head may be fitted to the blade and held thereto by the spring 9 as shown in Figs. 1 and 7, the latter figure showing the manner in which the spring arms will flex or bend to correspond with the size of the screw.

What I claim as my invention and desire to secure by Letters Patent is:

1. The combination with a screw driver having a shank provided with a screw engaging blade, the upper end of the screw engaging blade serving as an abutment, of screw holding means held against turning on the shank but movable longitudinally thereof and comprising a spring housing slidable on the shank, a coil spring in the housing, a movable abutment for the spring arranged to engage the abutment on the shank, and two spring screw holding arms projecting from the housing, said arms being formed separately from the material forming the housing and having portions within the housing lying between the outer face of the coil spring and the inner face of the housing.

2. The combination with a screw driver having a shank provided with a screw engaging blade, the upper end of the screw engaging blade serving as an abutment, of screw holding means held against turning on the shank but movable longitudinally thereof and comprising a spring housing slidable on the shank, a coil spring in the housing, a movable abutment for the spring arranged to engage the abutment on the shank, and two spring screw holding arms projecting from the housing, said arms having at their free ends inwardly turned screw engaging lugs, the ends of which are spaced apart a distance less than the thickness of the shank beyond the screw engaging blade so that the arms are placed under tension as the lugs move away from the blade by the engagement of the lugs with the shank at any point thereon.

3. The combination with a screw driver having a shank provided with a screw engaging blade, the upper end of the screw engaging blade serving as an abutment, of screw holding means held against turning on the shank but movable longitudinally thereof and comprising a spring housing slidable on the shank, a coil spring in the housing, a movable abutment for the spring arranged to engage the abutment on the shank, and two spring screw holding arms projecting from the housing, said arms having portions extending between the spring and the housing, and interlocking portions on the arms and the housing held in interlocking connection by the spring.

4. The combination with a screw driver having a shank provided with a screw engaging blade, the upper end of the screw-engaging blade serving as an abutment, of screw holding means held against turning on the shank but movable longitudinally thereof and comprising a spring housing slidable on the shank, a coil spring in the housing, a movable abutment for the spring arranged to engage the abutment on the shank, and two spring screw holding arms projecting from the housing, and said spring arms having portions lying within the casing between the outer faces of the abutment and the spring and the inner face of the housing.

5. The combination with a screw driver having a shank provided with a screw engaging blade, the upper end of the screw engaging blade serving as an abutment, of screw holding means held against turning on the shank but movable longitudinally thereof and comprising a spring housing slidable on the shank, a coil spring in the housing, a movable abutment for the spring arranged to engage the abutment on the shank, the casing having two spaced projections at one end provided with inwardly turned ends forming stops for the movable abutment, and two spring screw holding arms each having a portion projecting into the housing between two of the inwardly turned ends of a projection and between the outer face of the movable abutment and the inner face of the housing.

RUDOLPH J. VELEPEC.

and comprising a spring housing slidable on the shank, a coil spring in the housing, a movable abutment for the spring arranged to engage the abutment on the shank, the casing having two spaced projections at one end provided with inwardly turned ends forming stops for the movable abutment, and two spring screw holding arms each having a portion projecting into the housing between two of the inwardly turned ends of a projection and between the outer face of the movable abutment and the inner face of the housing.

RUDOLPH J. VELEPEC.

DISCLAIMER 1,791,771.—*Rudolph J. Velepec*, Rochester, N. Y. SCREW DRIVER. Patent dated February 10, 1931. Disclaimer filed June 3, 1940, by the assignee, *Upson Brothers Inc.*

Hereby disclaims claim 2 of said patent.

[*Official Gazette July 2, 1940.*]

DISCLAIMER 1,791,771.—*Rudolph J. Velepec*, Rochester, N. Y. SCREW DRIVER. Patent dated February 10, 1931. Disclaimer filed June 3, 1940, by the assignee, *Upson Brothers Inc.*

Hereby disclaims claim 2 of said patent.
[*Official Gazette July 2, 1940.*]